Feb. 21, 1928.
J. E. SCHMIDT ET AL
PULLEY
Filed May 8, 1926
1,659,578
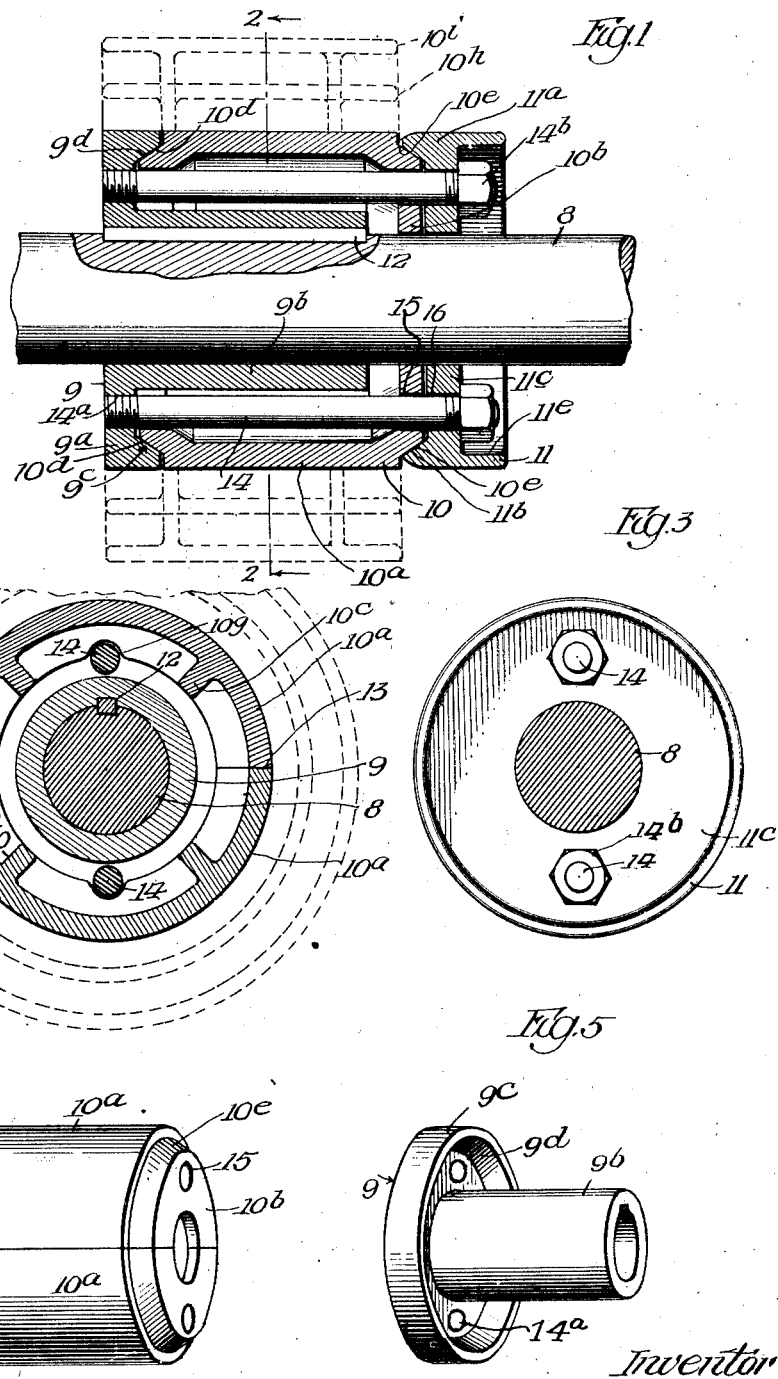
Inventor
John E. Schmidt
Clyde E. McArthur
By Fred Gerlach Atty.

Patented Feb. 21, 1928.

1,659,578

UNITED STATES PATENT OFFICE.

JOHN E. SCHMIDT, OF CHICAGO, AND CLYDE E. McARTHUR, OF EVANSTON, ILLINOIS, ASSIGNORS TO KLING BROS. ENGINEERING WORKS, OF CHICAGO, ILLINOIS, A CORPORATION OF ILLINOIS.

PULLEY.

Application filed May 8, 1926. Serial No. 107,594.

The invention relates to pulleys and more particularly to that type in which the rim of the pulley is removably secured to permit the substitution of rims of different diameters.

The object of the invention is to provide a pulley of this type which is simple in construction, efficient in operation and which permits ready removal and replacement of the rims.

The invention consists in the several novel features hereinafter set forth and more particularly defined by the claims at the conclusion hereof.

In the drawing: Fig. 1 is a longitudinal section of a pulley embodying the invention. Fig. 2 is a section taken on line 2—2 of Fig. 1. Fig. 3 is an end elevation. Fig. 4 is a perspective of the removable rim. Fig. 5 is a perspective of the flanged hub for carrying the rim.

The invention is exemplified in a pulley which is applied to a shaft 8 and comprises a body-member 9, a sectional rim 10 and a ring 11 for clamping the rim on the body. The body 9 comprises a side flange or wall $9^a$ and a hub or sleeve $9^b$ extending inwardly from the wall $9^a$ and secured to rotate with the shaft by a key 12. Wall $9^a$ is extended longitudinally to form an annular rib $9^c$ which is provided with an inwardly facing conoidal surface $9^d$. The pulley-rim is split, as at 13, and formed of sections to permit it to be placed on and removed from the body 9, which in practice is necessary where it is desired to effect replacement where the pulley is not removable endwise from the shaft. Each section comprises a semi-cylindric rim portion $10^a$, an integral end wall portion $10^b$ and longitudinal ribs $10^c$ integrally formed with the sections. Adjacent one end, the rim sections $10^a$ are formed with an integral rib or extension on which is formed a tapered conoidal peripheral surface $10^d$ which engages and fits against the conoidal surface $9^c$. At the opposite end, the rim sections are provided with oppositely tapered peripheral portions $10^e$. Ring 11 comprises a rib $11^a$ extending longitudinally inward and provided with a conoidal inner periphery $11^b$ to engage the tapered peripheral portions $10^e$ of the rim sections. The ring also comprises a radial wall $11^c$ which extends to the shaft 8. Each rim section is secured and clamped in place by a longitudinally extending bolt 14, one end of which is threaded, as at $14^a$, to the wall $9^a$ of the body. Each bolt 14 extends through a hole 15 in the end wall portion $10^b$ of one of the rim sections and through a hole 16 in the wall $11^c$ of the ring 11. Nuts $14^b$ are threaded through the ends of the bolts which pass through ring 11. Said nuts serve to force the ring 11 longitudinally toward the wall $9^a$ of the body 9 and this action causes the conoidal surfaces $9^c$ and $11^b$ on the body and ring respectively to draw the rim sections together and to clamp them longitudinally between wall $9^a$ and the ring 11.

In some instances, it is desirable to use pulley-rims having peripheries of different diameters, such as $10^h$ and $10^i$ which are indicated by dotted lines in Fig. 1. In grinding machines, it is desirable to increase the speed of the grinder shaft as the grinding wheel becomes worn, to maintain an efficient surface speed of its periphery. When such a change is desired, it is merely necessary to remove the nuts $14^b$ and then move the ring 11 axially off the bolts 14. The rim sections will then be moved axially away from the wall $9^a$ until the end wall sections $10^b$ of the rim sections are off the bolts, and thereupon the rim sections will be free to be removed radially outward from the shaft.

Ring 11 is formed with a longitudinally extending rib or flange $11^e$ to enclose the nuts $14^b$. The rim sections $10^a$ are notched, as at $10^g$, so that in removing said sections from the bolts, it is only necessary to move them endwise sufficiently to bring the wall $10^b$ so it will clear the end of the bolt. This is of importance where the clearance between the ring 11 and the bearing is restricted. The ribs $10^c$ serve to reinforce the rim sections between its ends, so that there is no danger of rupturing or bulging the rim portions by excessive endwise clamping pressure.

The invention exemplifies a pulley with a removable rim in which the rims are clamped to a body by longitudinally extending bolts which do not subject the pulley to any rotative stresses while the nuts are being tightened. In practice, it has been found that when a screw-threaded collar is used for this purpose, the pulley is rendered inoperative by wear on the screwthreads. The invention also exemplifies a pulley with a removable rim which is provided with a wall at one end through which the clamping bolts pass and which extends to the shaft so that in placing the rim on the shaft, the wall will position the rim concentrically around the shaft while its other end enters into interfitting engagement with the body. The invention also exemplifies a pulley with a removable rim which is durable and can be manufactured at a low cost.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In a pulley, the combination of a one-piece body comprising a hub adapted to fit around and to be secured to a shaft and a radial wall integral with the hub and provided with an inwardly facing conoidal seat, a rim provided with a conoidal surface to fit against the conoidal seat on the body and a radial wall extending to the shaft and bolts extending through the walls of the rim and body and provided with nuts for clamping the rim against the wall of the body.

2. In a pulley, the combination of a one-piece body comprising a hub adapted to be secured to a shaft and a radial wall integral with the hub and provided with a conoidal seat, a rim formed of semi-cylindrical sections, each having a peripheral portion, a conoidal surface to fit against the conoidal seat on the body and a radial wall-section integral with the peripheral portion and extending to the shaft, and bolts fixed in the body, extending through the wall sections of the rim and provided with nuts for clamping the rim against the wall of the body.

3. In a pulley, the combination of a one-piece body comprising a hub adapted to fit around and to be secured to a shaft and a radial wall integral with the hub and provided with an inwardly facing conoidal seat, a rim having a central periphery provided at one end thereof with a conoidal surface to fit against the conoidal seat on the body and a radial wall extending to the shaft, and bolts fixed in the body extending through the wall of the rim and provided with nuts for clamping the rim against the wall of the body, the hub of the body extending from the wall on the body to a point adjacent the wall on the rim.

4. In a pulley, the combination of a one-piece body comprising an end wall provided with an inwardly facing annular conoidal seat, and an integral hub adapted to be secured to a shaft, a one-piece ring provided with an inwardly facing annular conoidal seat, a rim provided with conoidal surfaces at its ends to fit against the seats on the body and ring respectively, and bolts within the rim and extending through the ring and body and provided with nuts for clamping the rim between the body and the ring.

5. In a pulley, the combination of a one-piece body comprising an end wall provided with an inwardly facing annular conoidal seat and an integral inwardly extending hub adapted to be secured to a shaft, a one-piece ring provided with an inwardly facing annular conoidal seat, a rim formed of cylindric sections, each provided with semi-annular conoidal surfaces at its ends to fit against the seats on the body and ring respectively, and bolts, fixed in the body, extending through the ring and provided with nuts for forcing the ring to clamp the rim-sections between the body and the ring.

6. In a pulley, the combination of a one-piece body comprising an end wall provided with an inwardly facing annular conoidal seat and an integral inwardly extending hub adapted to be secured to a shaft, a one-piece ring provided with an inwardly facing annular conoidal seat, a rim provided with conoidal surfaces at its ends to fit against the seats on the body and ring respectively, and bolts fixed in the body, extending through the radial wall of the rim and ring and provided with nuts for forcing the ring to clamp the rim between the body and the ring.

7. In a pulley, the combination of a one-piece body comprising a hub and integral end wall provided with an inwardly facing conoidal seat, a ring provided with an opposed conoidal seat, a rim provided at its ends with conoidal portions to fit said seats, and provided with internal longitudinally extending integral reinforcing ribs, bolts secured in the end wall of the body and extending through the ring and provided with nuts for forcing the ring to clamp the rim between the ring and the wall on the body.

8. In a pulley, the combination of a one-piece body comprising a hub and integral end wall provided with an inwardly facing conoidal seat, a ring provided with an opposed conoidal seat, a rim formed of semi-cylindric sections each provided with a radial wall at one end, and both ends with conoidal portions to fit against said seats, and with internal longitudinally extending integral reinforcing ribs, bolts secured in the end wall of the body and extending through the walls of the rim sections and the ring and provided with nuts for forcing the ring to clamp the rim sections between the ring and the wall on the body.

Signed at Chicago, Illinois, this 28th day of April, 1926.

JOHN E. SCHMIDT.
CLYDE E. McARTHUR.